United States Patent [19]

Freychet et al.

[11] Patent Number: 5,119,464
[45] Date of Patent: Jun. 2, 1992

[54] OPTICAL FIBER MARKING METHOD AND DEVICE

[75] Inventors: Claude Freychet, Montesson; Alain Tauleygne, Franconville, both of France

[73] Assignee: Alcatel Cable, Clichy Cedex, France

[21] Appl. No.: 668,833

[22] Filed: Mar. 13, 1991

[30] Foreign Application Priority Data

Mar. 15, 1990 [FR] France ................. 90 03334

[51] Int. Cl.⁵ ............................ G02B 6/00
[52] U.S. Cl. .................... 385/147; 385/901; 346/1.1
[58] Field of Search ............ 350/96.10, 96.24; 346/1.1

[56] References Cited

U.S. PATENT DOCUMENTS

| | | | |
|---|---|---|---|
| 4,503,437 | 5/1985 | Katzschner | 346/1.1 |
| 4,590,492 | 5/1986 | Meier | 350/96.10 |
| 4,619,842 | 10/1986 | Moss et al. | 427/163 |
| 4,797,691 | 1/1989 | Akiyoshi et al. | 350/96.20 |
| 4,820,013 | 4/1989 | Fuse | 350/96.20 |

FOREIGN PATENT DOCUMENTS

| | | |
|---|---|---|
| 3637159 | 5/1988 | Fed. Rep. of Germany . |
| 1536178 | 12/1978 | United Kingdom . |
| 2142280 | 1/1985 | United Kingdom . |

Primary Examiner—Akm E. Ullah
Attorney, Agent, or Firm—Sughrue, Mion, Zinn, Macpeak & Seas

[57] ABSTRACT

Optical fibers are marked as they move continuously in a flat bundle prior to insertion into a protective envelope by continuously spraying an ink jet in a plane intersecting all the fibers, alternately from one extreme fiber to the other. The inkjet is sprayed in a plane perpendicular to the direction of forward movement of the fibers. The marking device comprises a head for spraying a jet of ink in a plane intersecting all the fibers reciprocating from one extreme fiber of the flat bundle to the other. The spray head moves in a plane perpendicular to the direction of forward movement of the fibers.

4 Claims, 1 Drawing Sheet

OPTICAL FIBER MARKING METHOD AND DEVICE

BACKGROUND OF THE INVENTION

1. Field of the invention

The present invention concerns a method of marking optical fibers as they move continuously as a flat bundle in a longitudinal direction prior to their insertion into a protective jacket such as a tube or grooves in a rod. It also concerns a device for implementing this method.

2. Description of the prior art

It has previously been proposed to mark optical fibers by passing them individually through a bath of a particular color ink or of a particular length. A method of this kind requires the use of a different marking bath for each optical fiber. It sometimes modifies the characteristics of the marked optical fibers.

An object of the present invention is to provide an optical fiber marking method and device which operate on only a very short length of the fibers, which requires only very simple equipment, which is not costly and which does not modify the fiber characteristics.

SUMMARY OF THE INVENTION

In one aspect, the present invention consists in a method of marking optical fibers as they move continuously in a flat bundle prior to insertion into a protective envelope by continuously spraying an ink jet in a plane intersecting all the fibers, alternately from one extreme fiber to the other. The spraying plane is preferably perpendicular to the direction of forward movement of the fibers.

In another aspect, the present invention consists in a device for implementing a method of marking optical fibers as they move continuously in a flat bundle prior to insertion into a protective envelope by continuously spraying an ink jet in a plane intersecting all the fibers, alternately from one extreme fiber to the other, which device comprises a head for spraying a jet of ink in a plane intersecting all the fibers reciprocating from one extreme fiber of the flat bundle to the other. The spraying plane is preferably perpendicular to the direction of forward movement of the fibers.

One method and one device in accordance with the invention are described below by way of example and with reference to the appended drawing.

DETAILED DESCRIPTION OF THE INVENTION

Figure 1:
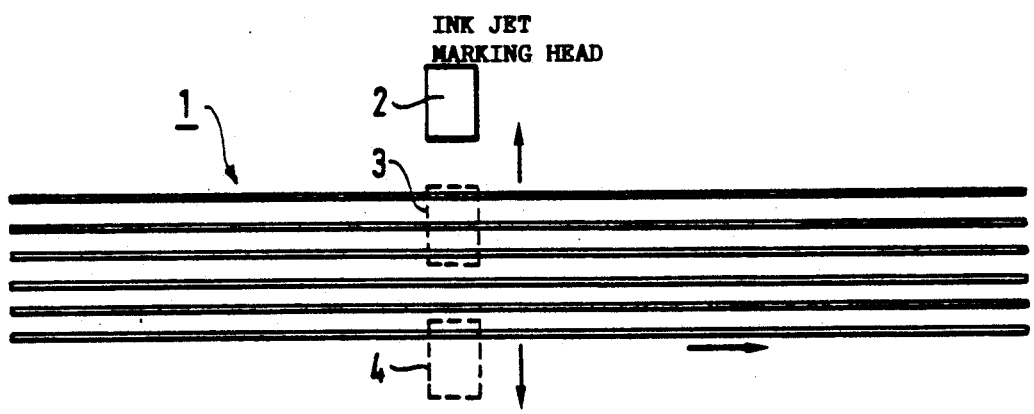
FIG. 1 shows a flat bundle of optical fibers and the reciprocating movement of a marking head perpendicular to their direction of forward movement.

Referring to FIG. 1, the flat bundle 1 of optical fibers moves continuously from the left towards the right of the figure. Above the flat bundle is a downwardly directed ink jet marking head 2 which is reciprocated in a plane perpendicular to the direction of forward movement of the flat bundle of fibers. It assumes positions including those shown in dashed outline at 3 and 4.

Figure 2:
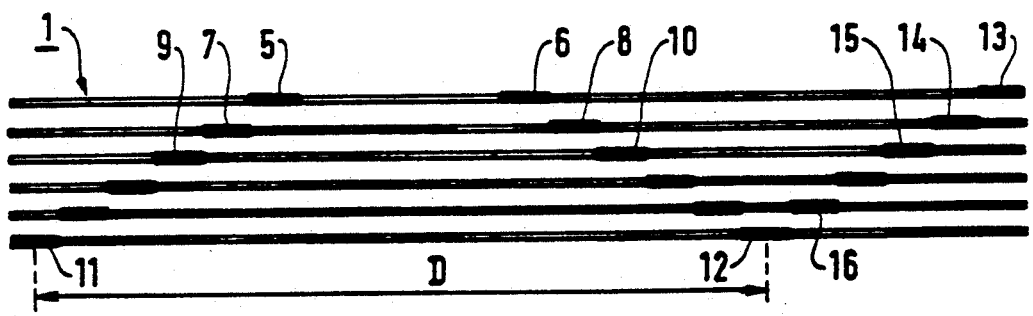
FIG. 2 shows the marks printed on the optical fibers on the downstream side of the marking head.

FIG. 2 is a schematic representation of the marks printed on the optical fibers, including marks 5 and 6 on the extreme lefthand fiber, marks 7 and 8 on the next fiber, marks 9 and 10 on the next fiber, and so on up to marks 11 and 12 on the extreme righthand fiber. The marks 11 through 5 are printed during upward movement of the marking head as shown in FIG. 1 and the marks 6 through 12 are printed during its downward movement. On moving upward in FIG. 1, the marking head has previously printed the marks 16 through 13 on the optical fibers. It is assumed that the marking head is offset sufficiently from the extreme lefthand optical fibers in FIG. 1 to print two marks 5 and 6 on it during one cycle of movement and that its ink jet does not extend beyond the vertical line through the extreme righthand optical fiber, so that the latter receives only one mark per ink jet 11 or 12 for each cycle of the marking head, although this is not essential.

The optical fibers are marked with the pitch D shown in FIG. 2. The marks on all the optical fibers are differently spaced, which enables the fibers to be identified unambiguously throughout their forward movement.

What is claimed is:

1. Method of marking optical fibers prior to insertion of the fibers into a protective envelope comprising the steps of:
    continuously moving a plurality of optical fibers extending parallel to each other in a flat bundle in the longitudinal direction of the fibers; and
    continuously spraying an ink jet intersecting said plurality of fibers while moving the ink jet across a plane intersecting all fibers alternately from one laterally extreme fiber of said bundle to another opposite, laterally extreme fiber of said bundle.

2. A method according to claim 1, wherein said step of spraying said ink jet in a plane intersecting all of the fibers comprises moving said ink jet along a plane perpendicular to the direction of movement of the fibers.

3. Device for marking a plurality of optical fibers extending parallel to each other in a flat bundle comprising, means for continuously moving said optical fibers as a flat bundle in the longitudinal direction of the fibers, and a head for spraying a jet of ink in a plane intersecting all of the fibers, reciprocable from one laterally extreme fiber of the flat bundle to another laterally extreme fiber.

4. Device according to claim 3 wherein said spray head is reciprocable in a plane perpendicular to the longitudinal direction of movement of the plurality of optical fibers.

* * * * *